(No Model)
F. VON LEICHT & H. F. LANGE.
PNEUMATIC TIRE FOR BICYCLES.
No. 584,379. Patented June 15, 1897.
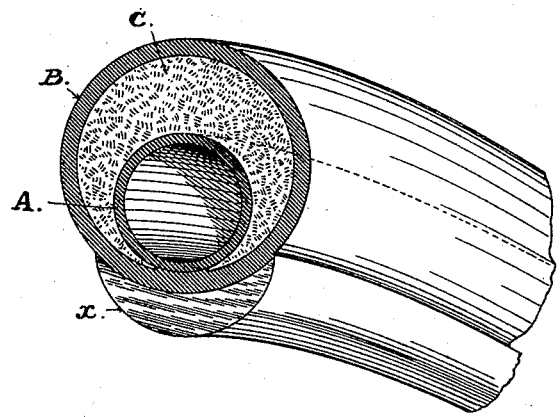

UNITED STATES PATENT OFFICE.

FERDINAND VON LEICHT AND HERMAN F. LANGE, OF SAN FRANCISCO, CALIFORNIA.

PNEUMATIC TIRE FOR BICYCLES.

SPECIFICATION forming part of Letters Patent No. 584,379, dated June 15, 1897.

Application filed October 23, 1895. Serial No. 566,636. (No model.)

*To all whom it may concern:*

Be it known that we, FERDINAND VON LEICHT and HERMAN F. LANGE, citizens of the United States, residing in the city and county of San Francisco, State of California, have invented certain new and useful Improvements in Pneumatic Tires for Bicycles, of which the following is a specification.

Our invention relates to an improved construction of pneumatic tires for bicycles whereby we seek to produce a light and elastic tire that cannot be punctured with nails or sharp-pointed obstacles on the roadway.

To such end our said invention consists, essentially, in a pneumatic tire constructed of an inner inflatable rubber tube, an outer elastic tube of relatively large diameter inclosing the air-inflated tube, in which the last-named tube is set and fixed eccentrically, and a body of fine sawdust closely packed or compressed into the crescent-shaped space between the said inflatable inner tube and the surrounding elastic tube constructed as hereinafter described and set forth, reference being had in the following description to the accompanying drawing, forming part of this specification, in which the figure represents in cross-section a portion of a pneumatic tire constructed according to our invention, a portion of the wooden rim of the wheel also being shown.

The inner tube A is air-tight and is capable of forming a pneumatic tire. The diameter of this tube when inflated should be about one inch. The outer tube B, also made of rubber or rubber fabric, should be about twice the diameter of the inner tube when so inflated, and the inner tube being inserted into such outer tube is secured in position eccentric to the surrounding tube and against the bottom or lower side of the inner wall thereof, forming a crescent-shaped space between the two tubes, with its greatest breadth between the top of the inner tube and the top of the outer tube that forms the tread or rim of the wheel. The two tubes are united at their point of contact D by means of cement, and the usual inflating-tube with check-valve (not shown in the drawing) to attach an air-pump is fixed in the wooden rim $x$ of the wheel and through the body of both tubes into the inner tube.

The space between the two tubes A B is closely packed with a body of fine dry sawdust, and the two tubes are securely fastened together to prevent the sawdust from being forced entirely around the inner tube, which would tend to bring it nearer to the tread of the wheel, thus rendering it more liable to be punctured. The ends of the tubes then being joined and united to form the tire, the packing is compressed into a close dense body by inflating the inner tube. The material for this packing C is best obtained from California redwood lumber, which makes sawdust of fine, dense, and at the same time elastic quality, and to increase such qualities we kiln-dry the packing material before using. In proceeding to introduce this packing material we partially inflate the inner tube and then pack the sawdust as evenly as possible in the space between the two tubes and then unite the ends to complete the tire ready for the wheel. When thus finished and placed around the rim of the wheel, the inner tube is inflated to its fullest extent to compress the sawdust and bring the tire to the required circular shape.

In our improved tire as thus constructed the air-inflated tube which gives the elastic quality to the tire is effectually protected from being cut or injured by sharp obstacles lying in the path of the rider, and the life of such tire is thereby greatly prolonged; but such advantage gained in and by such construction is not at the expense of the lightness or the elasticity of the tire, for the air-tube is not reduced in diameter to such an extent that the elastic property it gives to the tire is affected by such reduction, and the complete protection obtained by the body of sawdust enables us to make the tubes of relatively light or thin quality of rubber.

Having thus described our invention, what we claim, and desire to secure by Letters Patent, is—

In a pneumatic tire for bicycles, the combination with an outer elastic tube of an inner inflatable elastic tube having a diameter substantially one-half that of the outer tube, said inner tube being attached to the inner surface of the outer tube continuously on a line diametrically opposite to the tread of the outer tube, the inner tube and outer tube being separated by an interspace at all points outside of said line of attachment, said interspace having a filling of sawdust.

In testimony that we claim the foregoing we have hereunto set our hands and seals.

FERDINAND VON LEICHT. [L. S.]
  HERMAN F. LANGE. [L. S.]

Witnesses:
 C. W. M. SMITH,
 JAMES L. KING.